United States Patent [19] [11] 4,157,076
Roth et al. [45] Jun. 5, 1979

[54] WHEEL ROTATION INDICATOR

[76] Inventors: Leo Roth; Ursula Roth, both of 52-27 69th St., Maspeth, N.Y. 11378

[21] Appl. No.: 896,387

[22] Filed: Apr. 14, 1978

[51] Int. Cl.² ............................................. G01P 13/02
[52] U.S. Cl. ..................................... 116/215; 116/31; 116/200
[58] Field of Search ..................... 116/115, 31, 129 G, 116/129 Q, 129 C, 133, 135, 26, 28 R, DIG. 21; 340/30, 73; 33/1 N

[56] References Cited

U.S. PATENT DOCUMENTS

| | | | |
|---|---|---|---|
| 2,579,233 | 12/1951 | Hiatt | 116/31 |
| 3,415,217 | 12/1968 | McGrath | 116/115 |
| 3,569,932 | 3/1971 | Reed | 340/30 |
| 4,014,103 | 3/1977 | Roth | 116/129 G |

FOREIGN PATENT DOCUMENTS 251260 8/1927 United Kingdom ............... 116/129 C

Primary Examiner—S. Clement Swisher
Assistant Examiner—Denis E. Corr

[57] ABSTRACT

A device which, when secured to a non-horizontal planar rotatable wheel, will display the position of rotation of the wheel with respect to a reference position. The device utilizes a flat member defining in a plane a spiral path of constant cross-sectional area and constantly increasing radius. The member has a solid central area at which the spiral terminates and has a free end at which the spiral starts. Suitable bases secure the member to the center of the wheel in a position spaced thereabove. A loop element slidably engages the member.

2 Claims, 7 Drawing Figures

U.S. Patent  Jun. 5, 1979  4,157,076
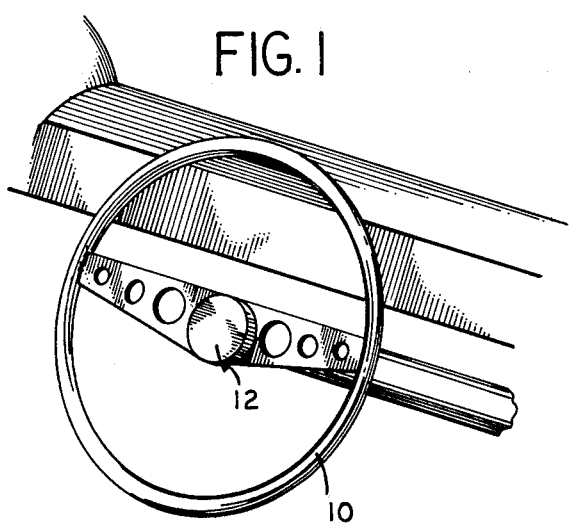
FIG. 1
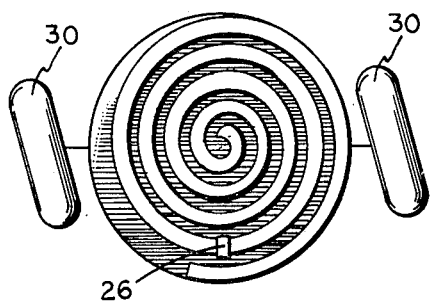
FIG. 4A
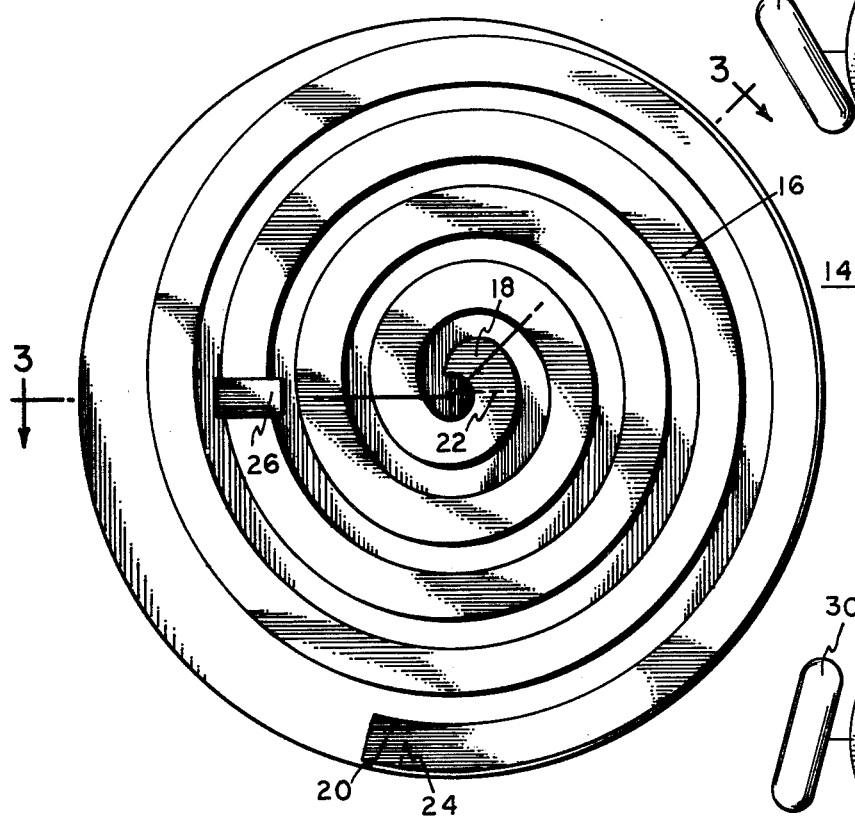
FIG. 2
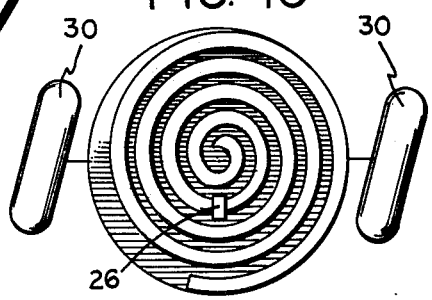
FIG. 4C
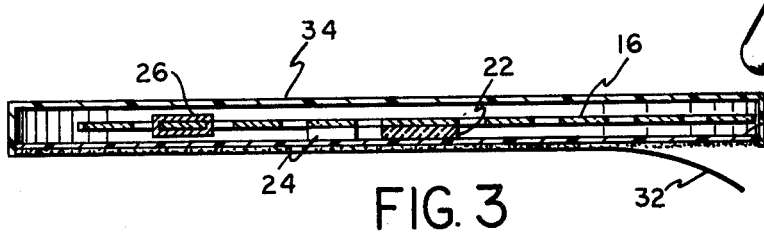
FIG. 3
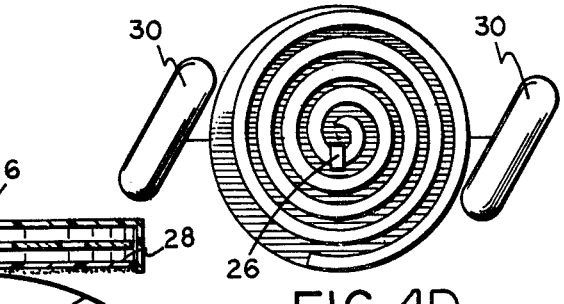
FIG. 4B
FIG. 4D

WHEEL ROTATION INDICATOR

PRIOR ART STATEMENT

U.S. Pat. No. 3,415,217 discloses a device which, when secured to a rotatable wheel, will display the position of rotation of the wheel with respect to a reference position. U.S. Pat. No. 4,014,103 shows a similar device for measuring distance. Each of these devices employs a spiral groovelike path in an exposed surface. A sphere is disposed in the path and can roll therealong. The location of the sphere in the path shows the degree to which the sphere has been rotated from some initial position. The present invention performs the same function in a simpler, cheaper, and more accurate fashion by employing a different structure.

SUMMARY OF THE INVENTION

It is frequently useful to know how far a wheel, such as a steering, wheel, a valve handle, or the like has been rotated. The invention is directed toward a simple device that can be attached to the wheel in question in order to visually display the position of the wheel. A primary application of this invention is for use on an automobile or truck. A driver using this device will always be able to know how the front wheels are positioned even when the actual position of the wheels cannot be seen because of snow, mud, or other obstruction. Moreover, when the wheel position is changed, this device immediately displays the new position. A driver of a vehicle temporarily bogged down in snow or mud can easily position the front wheels properly to provide optimum conditions to dislodge the vehicle with use of this device.

In this invention, however, a flat member defines in a plane a spiral path of constant cross-sectional area and constantly increasing radius. The member has a central area at which the spiral terminates and has a free end at which the spiral starts. Means secure the member to the center of the wheel in a position spaced thereabove. A loop element slidably engages the member. As the wheel is turned, the element will slide along the member towards that point which is lowest and will stay there, having nowhere else to go but upwardly, against gravity. A suitable scale is carried on the member and the element can be extremely thin, thus permitting a more accurate reading than obtainable with the use of the known arrangement employing a sphere moving in a spiral groove. Moreover, the element and member are simpler to assemble and cheaper to manufacture than such sphere and spiral grooves.

BRIEF DESCRIPTION OF THE DRAWINGS

FIG. 1 shows a steering wheel of an automobile ready to receive the invention.

FIG. 2 is an enlarged plan view of the invention.

FIG. 3 is a view taken along line 3—3 in the FIG. 2.

FIGS. 4a, 4b, 4c, and 4d illustrate operation of the invention in indicating different degrees of rotation.

DETAILED DESCRIPTION OF PREFERRED EMBODIMENTS

Referring first to FIGS. 1-3, the steering wheel 10 of an automobile has a flat central disc 12 somewhat inclined. A flat member indicated generally at 14 defines in a plane a spiral path 16 of constant cross-sectional area and constantly increasing radius. The member has a central solid area 18 and a free end 20. Flat base members 22 and 24 secured at upper surfaces by suitable adhesive to the member at area 18 and end 20 respectively are also secured by adhesive at their lower surfaces to the top surface of flat disc 28. Disc 28 has a lower surface carrying an adhesive with a removable protective film 32. When this film is removed, this lower surface can engage the top of disc 12 to position the invention for use. Disc 28 is parallel to member 14.

If desired, members 22 and 24 can be integral with the member 14 and then secured at their lower surfaces as before or members 14, 22 and 24, and disc 28 can be formed as an integral unit.

A loop element 26 slidably engages the member. For ease of illustration, the element is shown to have appreciable width, but it can be made with very little width to resemble a pointer. To minimize friction, the element and/or member 14 can be coated with a material such as teflon or the like to promote ease of sliding. The element is looped completely about the member 14, and members 22 and 24 serve as stops to prevent the element from sliding off member 14.

In use, with the front wheels 30 of the automobile pointed directly ahead, the device is placed on the disc 12 with element 26 disposed halfway along the spiral. As the wheels are positioned for a left turn (FIG. 4a) or a sharper left turn (FIG. 4b), the element moves progressively towards end 20. As the wheels are positioned for a right turn (FIG. 4c) or a sharper right turn (FIG. 4d), the element moves progressively towards area 18. If desired, calibrations or turns can be imprinted or impressed into member 14. The user can tell by inspection the amount of rotation of the steering wheel.

If desired, the member 14 and element 26 can be protected by a suitable transparent cover 34.

The parts can be made of plastic, metal, wood, or any other suitable material.

The invention can be calibrated for use with any vehicle as long as the number of full turns of the steering wheel required to turn from extreme left to extreme right positions or vice versa is known.

We claim:

1. A device which when secured to a non-horizontal rotatable wheel will display the position of rotation of the wheel with respect to a reference position, said device comprising:

a flat base securable to the center of the wheel;

a flat spiral shaped member parallel to and disposed above the base, said flat member having a central area at which the spiral terminates and a free end at which the spiral starts, the spiral path having a constant cross sectional area and having a radius which is constantly increasing;

means disposed between the base and the member to support the member above the base, said means engaging the member only at the central area and the free end; and a loop slidably engaging the member and being movable there along to any position between the central area and the free end, said means preventing said loop from sliding off the member.

2. The device of claim 1 further including a transparent cover secured to the base and enclosing said member.